United States Patent [19]

Sanchez

[11] Patent Number: 4,785,850

[45] Date of Patent: Nov. 22, 1988

[54] CYLINDRICAL VALVE SOAP DISPENSER

[75] Inventor: George Sanchez, Northridge, Calif.

[73] Assignee: Clyde Industries Limited, Australia

[21] Appl. No.: 77,754

[22] Filed: Jul. 27, 1987

Related U.S. Application Data

[63] Continuation-in-part of Ser. No. 900,838, Aug. 27, 1986, abandoned.

[30] Foreign Application Priority Data

Nov. 7, 1986 [TW] Taiwan ............................ 75-105259

[51] Int. Cl.[4] ............................................ F16K 11/076

[52] U.S. Cl. ...................................... 137/894; 239/317

[58] Field of Search ...................... 137/625.29, 625.32, 137/894; 239/317

[56] References Cited

U.S. PATENT DOCUMENTS 2,507,410 5/1950 Kemp ............................ 137/894 X
3,352,320 11/1967 Camp ................................ 137/894
3,447,753 6/1969 Proctor et al. ..................... 239/317
3,770,205 11/1973 Proctor et al. ...................... 239/317
4,369,921 1/1983 Beiswenger ......................... 239/317

*Primary Examiner*—Robert G. Nilson
*Attorney, Agent, or Firm*—Christie, Parker & Hale

[57] ABSTRACT

A dispenser connectable to a source of high fluid pressure and including a housing having therein a three-position cylindrical valve which controls both a main passageway and an auxiliary passageway. The main passsageway extends through the housing and the cylindrical valve. The auxiliary passageway extends from the main passageway, through the cylindrical valve, through a passageway between the housing and cylindrical valve, through a fluid reservoir on the bottom side of the housing. The cylindrical valve is manually rotatable by a control knob to an "off" position where the main passageway is closed, to a "soap" position where both the primary and auxiliary passageways are open, dispensing fluid such as soap from the reservoir, and lastly, to a "rinse" position where the primary passageway is open and the auxiliary passageway is closed.

29 Claims, 4 Drawing Sheets

CYLINDRICAL VALVE SOAP DISPENSER

This application is a continuation in part of application Ser. No. 900,838 filed Aug. 27, 1986, now abandoned. A copy of this letter is enclosed for filing in the prior application file.

FIELD OF THE INVENTION

This invention relates to high pressure fluid dispensers and, more particularly, to a dispenser for introducing a fluid, such as soap, from a reservoir into a main stream of fluid passing through the dispenser.

BACKGROUND OF THE INVENTION

Dispensers are known which introduce and dispense in a main stream of high pressure fluid a second fluid, such as soap or detergent, or other chemicals mixed in a liquid solution. Soap dispensers are commonly used for introducing soap into a stream of water which is dispensed by a nozzle or is used to drive a water wheel in a rotary scrub brush.

Existing soap dispensers of this type suffer from a number of disadvantages including relatively high costs of manufacture, difficulty of cleaning the parts and a relatively large number of parts.

To reduce the cost of manufacturing, attempts have been made to make the dispensers of all, or virtually all, plastic molded parts. By way of example, U.S. Pat. Nos. 3,447,753 and 3,770,205 provide for the injection molding of four separate parts and the assembly of ten parts.

The present invention allows the construction of an improved dispenser. With the ever increasing costs for manufacture and labor, providing fewer parts in the ultimate assembly will have a direct effect on the cost of production for the product. Such efficiency enables the manufacturer to provide the product at a lower price. By way of contrast, the devices in the above patents involve a housing, a ball valve rotatable in the housing and a main passage through the housing and the ball valve. An auxiliary passage extends from an upstream portion of the main passage through the housing, to a secondary fluid reservoir at the bottom of the housing, then through the housing, back to a downstream portion of the main passage. A disc held on the end of the ball valve by a fragile plastic clip, closes and opens the openings to the reservoir in the auxiliary passage. O-rings, two in all, are required; one placed around each of the openings so that the valve member can close off the auxiliary passage. Also, due to the fragileness of the clip, repeated or improper use of the clip may break it. Additionally, two O-rings are required; one above and one below the main passage, for sealing between the top ball valve and the housing in which it rotates.

SUMMARY OF THE INVENTION

Briefly, in the preferred embodiment of the invention, a fluid dispenser is connected to a source of high pressure fluid. The dispenser housing contains a valve cavity wherein a rotatable valve is fitted. A main passage extends through the housing and the cylindrical valve. The upstream portion of the main passageway is connected to the source of high pressure fluid. A fluid container is connected to the bottom of the housing to form a reservoir for a soapy solution. At the opposite side of the housing is a control knob which is used for rotation of the cylindrical valve. An auxiliary passage extends from the upstream portion of the main passage in the cylindrical valve, to a groove between the cylindrical valve and housing to a groove in the reservoir. From the reservoir the auxiliary passage extends through a groove in the reservoir through a groove between the cylindrical valve and the housing and through the cylindrical valve back to the downstream side of the main passage. The cylindrical valve has three positions for adjustment of the main and auxiliary passages. In the first rotational position of the cylindrical valve, the flow of high pressure fluid passes through the main passage is blocked. In a second rotational position of the cylindrical valve, the high pressure fluid passes through the main passage in the housing and through the cylindrical valve. In this position, a secondary flow of high pressure fluid is shunted from the main passage and passes high pressure fluid through the auxiliary passage. Lastly, in a third rotational position of the cylindrical valve, the high pressure fluid passes through the main passage in the housing and cylindrical valve, with fluid flow blocked from the auxiliary passage by a disc-shaped valve member at the bottom of the cylindrical valve.

Significantly, the present invention allows the grooves within the reservoir to be closed off without the need for gaskets or O-rings as discussed in U.S. Pat. Nos. 3,447,753 and 3,770,205. To this end, grooves are placed down the valve cavity between the cylindrical valve and housing to allow the openings to the reservoir to be positioned at the minimum radial distance from the center of rotation of the cylindrical valve and closely adjacent the outer edge of the valve cavity. As a result, the force required on the cylindrical valve to insure a good, tight seal between the bottom side of the housing and the valve member is minimized. Thus, the closing of the auxiliary passage may be accomplished by the valve member sliding against the bottom surface of the housing itself, without the need for O-rings. This construction also minimizes the structural strength needed and therefore the amount of material needed for the valve member. Additionally, structural strength is enhanced by molding the cylindrical valve and valve member as an integral plastic part without the need for clips.

Broadly, the invention can also be described as a fluid dispenser with a housing having a top side and a bottom side. The bottom side is for a coupling to a container forming a fluid reservoir. A valve cavity extends through the housing from top to bottom sides. The cylindrical valve is insertable into the valve cavity from the bottom side. A valve member is formed integrally as a unit with the cylindrical valve and extends outwardly beyond the valve cavity into closely spaced opposed relation with the housing bottom side. A main passage extends through the housing and cylindrical valve substantially transverse to the valve cavity. Means is provided for coupling the upstream portion of the main passage to a high pressure fluid source. An exposed control knob is connected to the cylindrical valve at the top side of the housing for manually rotating the cylindrical valve and for securing the cylindrical valve, relative to the housing, so that the substantially opposed relation between the housing bottom side and valve member is maintained. A groove is provided around the cylindrical valve in the valve cavity. An O-ring is provided in the groove forming a fluid seal between the housing and cylindrical valve toward the housing top side from the main passage. An auxiliary passageway extends from the upstream main flow passage, through the reservoir, to the downstream flow passage. The first, second and third rotational positions discussed above block the flow of high pressure fluid through the main passage, passes the high pressure fluid through the cylindrical valve and in addition shunts a secondary flow of high pressure fluid through the auxiliary passage including the reservoir and passes the high pressure fluid through the main passage while blocking the secondary flow of fluid through the auxiliary passage block by the valve member.

In a preferred embodiment of the invention, the auxiliary passageway comprises an upstream passage extending through the housing in a direction transverse to the main passageway, through a passage in the valve member into the soap reservoir; and a downstream passage extending from the soap reservoir through another passage in the valve member, through a passage in the housing, transverse to and ending in the downstream main passageway downstream of the valve cavity.

The alternate embodiment with the addition of O-rings around the upstream and downstream passages through the main housing has the advantage of requiring less-exacting tolerances for valve and housing construction. Additionally, because the auxiliary passageway is less complicated, manufacture of the ball valve is easier.

In various embodiments of the present invention, the number of parts can be minimized and performance improved over the prior devices. For example, the total number of parts can be reduced to only three injection molded parts and a total assembly of eight parts as compared with four and ten, respectively, in the above prior art devices.

Lastly, placing an O-ring in a groove around the cylindrical valve above the main passage, allows the O-ring to rotate with the O-ring reducing the frictional forces between the knob and O-ring which otherwise occur if the O-ring did not rotate with the knob. Also, placing an O-ring around the main passage at the upstream side of the cylindrical valve, between the housing and cylindrical valve, reduce pressure build-up in the reservoir when the valve is turned off.

DESCRIPTION OF THE PREFERRED EMBODIMENT

Figure 2:
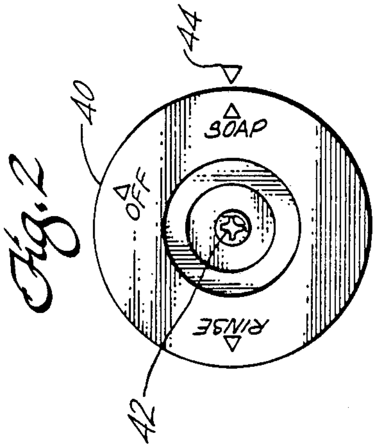
FIG. 2 is a top plan view of the control knob, illustrating the control knob at the "soap" position, and showing the indicia for the "rinse" and the "off" positions.

Referring more particularly to the drawings, soap dispenser 10 has a handle in the form of a conduit 12 connectable to the discharge end of a standard hose (e.g., garden hose), which provides a high pressure flow of water or fluid through the soap dispenser. A male threaded connector (not shown) on the hose is connected to an internal threaded connector 14 at the left end of conduit 12. The right end 16 of the conduit 12 is slipped into and locked by detentes on the intake end 28 of housing 18, which is detachably connected to a reservoir 20.

Conduit 12 leads to the intake end of a main passageway 22 which extends through the housing 18 and a cylindrical valve 24, located in the valve cavity 26 portion of the housing. The passageway 22 will not extend through the housing and cylindrical valve 24 unless the cylindrical valve 24 is properly positioned. Although the conduit 12 may be glued or molded into the intake tube 28, detente loading reduces assembly time and cost of manufacture. An O-ring 31, made of rubber or like material, is positioned at the end portion 16 of the conduit 12, and ensures against leakage of water between the intake tube 28 and the conduit 12. The discharge end 30 of the main passageway 23 is sized to snugly receive the extension of an intake tube (not shown) of a water wheel driven, rotary scrub brush. In the preferred embodiment, the discharge end 30 has external threads 33 for threading into internal threads of a connector (not shown).

The housing has a ring-shaped flange 32 at its underside, for connection to a container 20, which together form a reservoir for a fluid or other material to be dispensed. The container 20 will be connected in such a manner as to ensure easy disconnection, as for refilling in the "off" position and a leakproof fit when connected to the flange 32. In the preferred embodiment, the container has external threads 38 to receive internal threads 39 on the flange 32, at the bottom side of the housing 18. The container 20 is molded to receive and hold an O-ring 19 of rubber or like material, and ensures against leakage of water between the container and flange 32 when the container 20 is fastened to the flange 32.

Figure 4:
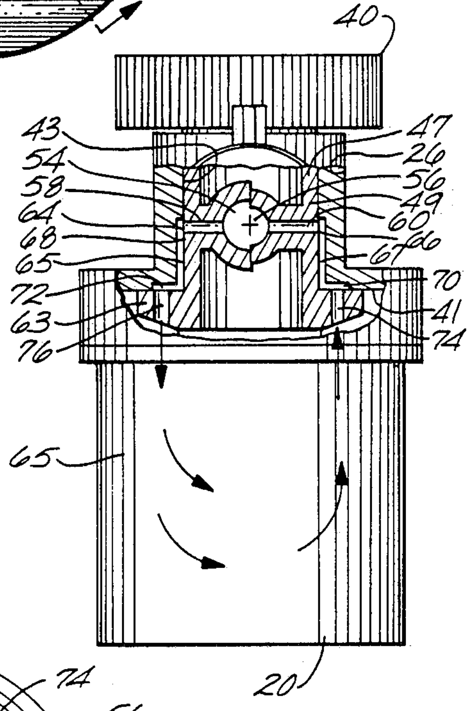
FIG. 4 is a left side elevation view of the soap dispenser, partially in section, taken along line 4—4 of FIG. 3.

A control knob 40 enables an operator of the soap dispenser 10 to directly effect the positioning of the cylindrical valve and thus control the main passageway 52, through the cylindrical valve (FIG. 1), and an auxiliary passageway 65 (FIG. 4). The control knob 40 is a circular disc-member which has conveniently placed on the top side markings which indicate "off", "soap" and "rinse" positions, as illustrated in FIG. 2. The control knob 40 is mounted in any conventional manner to the top side of the cylindrical valve 24. Preferably, a standard screw 42 is used to secure the control knob 40 to the top end of the cylindrical valve. Splines 51, on the bottom side of the control knob, fit into a spline hole 53, in the top side of the cylindrical valve 24, to ensure that the cylindrical valve 24 is mechanically positioned with respect to the control knob 40. Referring to FIG. 4, the control knob 40 is preferably large in diameter and extends past the edge of the housing 18, in order for the operator to get better leverage and grip for positioning the control knob 40 and cylindrical valve. In addition, a detente is provided in the upper part of the housing, below the control knob, to provide a slight resistance in the "off" position, for a mechanical indication of the "off" position.

Figure 1:
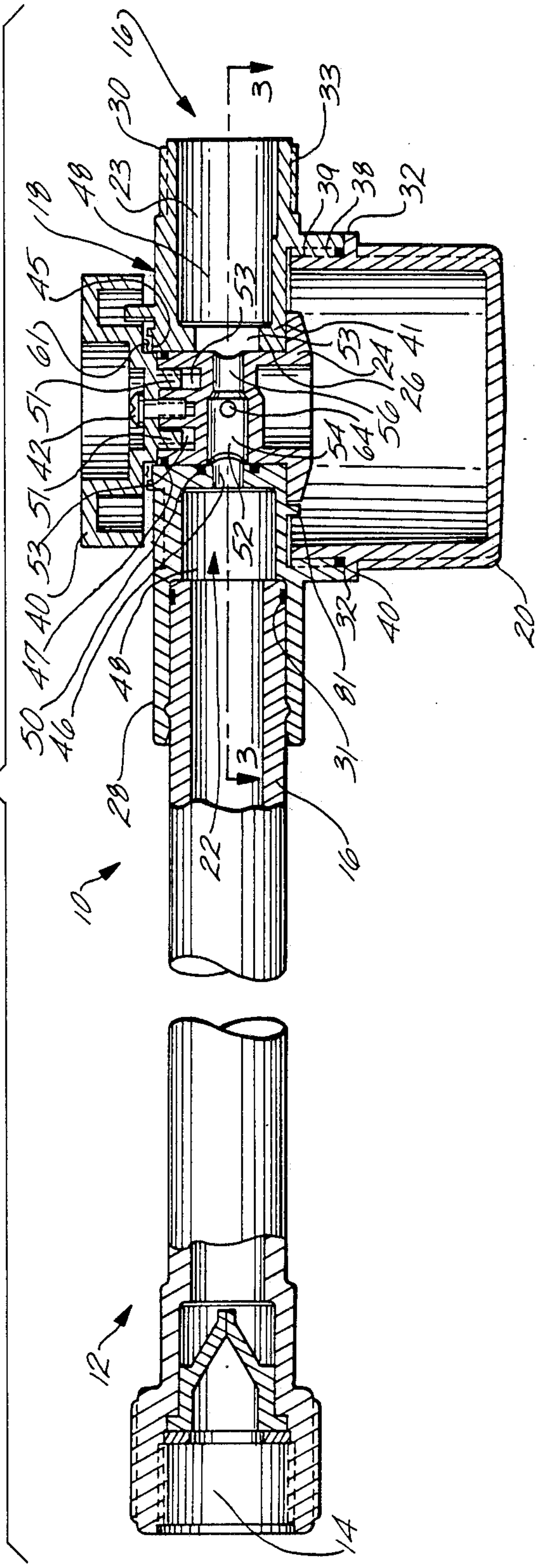
FIG. 1 is a side elevation view, partially in section, of a soap dispenser and embodies the present invention.

Referring to FIG. 1 from left to right high pressure fluid, such as water, flows through the main passageway 22, which extends through the upstream portion of the housing 18, to an orifice 46 leading into the valve cavity 26. This cavity is cylindrical in shape, and contains the cylindrical valve 24. O-ring 50, preferably made of rubber or like material, seals tightly against and conforms to the outer side of the cylindrical valve in the valve cavity. The O-ring 50 helps to seal off intake water from the valve cavity 26 and the main passageway 22, when the cylindrical valve 24 is in the "off" position.

Figure 6:
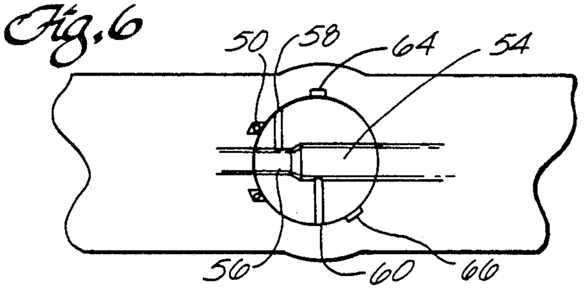
FIG. 6 is a schematic view of the soap dispenser similar to FIG. 3, except, the cylindrical valve is shown in the "rinse" position.
Figure 7:
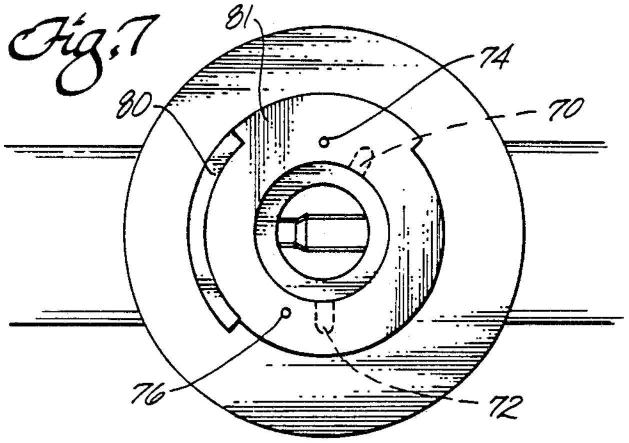
FIG. 7 is a schematic view of the soap dispenser similar to FIG. 5, except, the cylindrical valve is shown in the "rinse" position.
Figure 8:
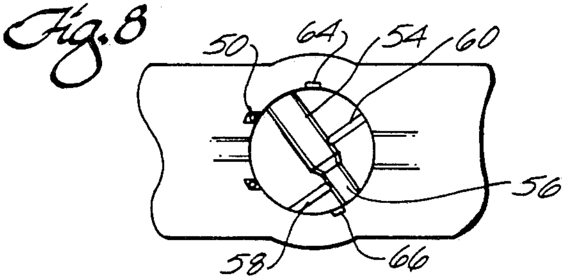
FIG. 8 is a schematic view of the soap dispenser similar to FIG. 3, except, the cylindrical valve is shown in the "off position;"
Figure 9:
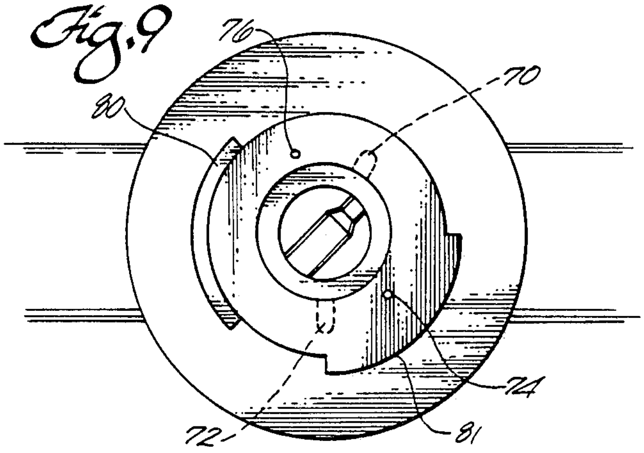
FIG. 9 is a schematic view of the soap dispenser similar to FIG. 5, except, the cylindrical valve is shown in the "off" position.

The main passageway 22 extends diametrically through a central portion 52 of the cylindrical valve 24, so that the main passageway 22 allows flow therethrough when the control knob 40 is in either the "rinse" position (FIGS. 1, 3) or the "soap" position (FIGS. 6, 7).

In FIG. 1, when the control knob 40 is in the "soap" position, an upstream portion 54 of the main passageway 52, through the cylindrical valve, has a large diameter; for example, of ⅜ inch, and a downstream portion 56, for example, of ¼ inch. Accordingly, in FIG. 6, when the control knob is rotated 180° to the "rinse" position, the upstream portion 54 and downstream portion 56 are reserved.

Referring to FIGS. 1 and 4, the cylindrical valve 24 has a smooth, cylindrical, wall surface 43, which is about the same size as, but slightly smaller than, the cylindrical-shaped valve cavity 26 and freely rotates within cylindrical valve cavity 26. A substantially watertight seal is formed between the O-ring 50 and the surface of the cylindrical shaped valve. The cylindrical valve 24 has two orifices 64 and 66 at the ends of two passageways 58 and 60 that extend from the upstream and downstream portions 54 and 56, respectively, of the main passageway 52 through the cylindrical valve 24.

Figure 3:
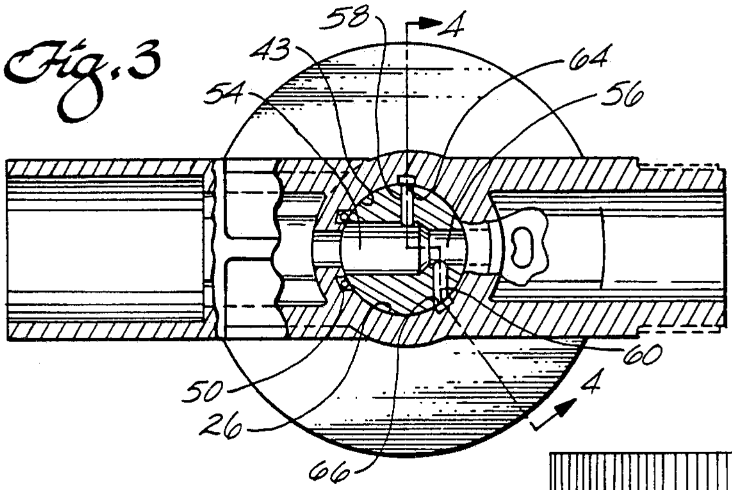
FIG. 3 is a sectional view taken along line 3—3 of FIG. 1, showing the cylindrical valve in the "soap" position.
Figure 5:
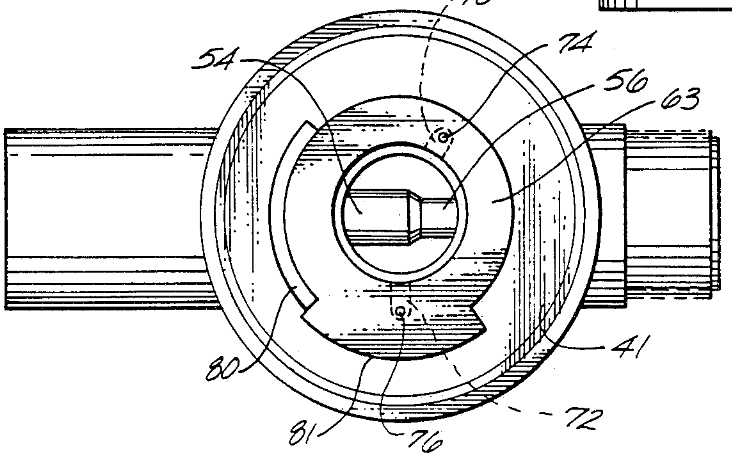
FIG. 5 is a bottom elevation view of the soap dispenser, showing the cylindrical valve in the "soap" position.

As seen in FIGS. 4 and 5, a disc-shaped valve member 63 extends from the cylindrical valve outwardly beyond the valve cavity 26 abutting with the flat side 41 of the housing. The valve member together with the cylindrical portion 49 of the cylindrical valve 24 are integrally molded together as a unit, so that, when the control knob 40 is rotated, the valve member 63 rotates as well. Provided through the valve member 63 are two ports 74 and 76 which control passage of fluid through the auxiliary passageway 65 extending from the main passageway 52 (FIG. 3). The auxiliary passage 65 includes grooves 68 and 67 extending longitudinally along the wall surface 43 of the valve cavity 26, radial grooves 72 and 70 on the bottom side 41 of the housing and upstream and downstream passages 58 and 60. Rotation of the valve member 63 and the control knob 40 are limited by a circular stop wall 80 protruding from the bottom side of the housing 41. The circular stop wall 80 circumferentially surrounds the valve member 63 for, preferably, 90°. In addition, the valve member 63 is provided with an abutment 81 extending diametrically beyond the stop wall 80, and circumferentially around the valve member for, preferably, 90°. Together, the abutment and stop wall limit rotation of the valve member and cylindrical valve to only 180° rotations from the "soap" and "rinse" positions.

In the "soap" position (FIGS. 3, 4 and 6), the two ports 74 and 76 register with two reservoir grooves 70 and 72, respectively, of the auxiliary passageway 65 at the bottom of the housing 41. The top side of valve member 63 is forced up against the bottom side 41 of the housing 41 by a spring in the form of a wavy washer 61 located between the bottom surface of the control knob 40 and the top side of the housing 26. By forcing the valve member 63 tightly against the bottom side of the housing 41, leakage of fluid from the main valve passageway 52 through auxiliary passageway 65 is minimized when in the "rinse" or "off" positions.

When the control knob 40 is in the "soap" position, valve orifices 64 and 66 align with upstream housing groove 68 and a downstream housing groove 67, respectively (FIG. 4). These grooves are located between the valve cavity 26 and the cylindrical valve. Preferably, the grooves are molded entirely within the wall surface 48 of the valve cavity 26. Each groove extends down to separate openings or reservoir grooves 70 and 72, respectively, in the surface of the bottom side 41 of the housing 18 (FIG. 5). When the control knob is in the "soap" position, the upstream and downstream portions of main passageway 52 through the cylindrical valve 24 are remotely connected to the reservoir 20 by the auxiliary passageway 65.

Significantly, the present invention allows the opening or reservoir grooves 70 and 72 into the reservoir 20 to be closed off without the need for gaskets or O-rings to be attached to the grooves. To accomplish this, grooves 68 and 67 are placed down the surface of the valve cavity to allow the grooves 70 and 72 to the reservoir 20 to be positioned at the minimum radial distance from the center of rotation of the cylindrical valve and closely adjacent the outer edge of the valve cavity. As a result, the force required on the cylindrical valve to ensure a good, tight seal between the bottom of the housing 41 and the valve member 63 can be minimized.

In addition, O-ring 47 is positioned in a groove in the cylindrical valve between the top end of the cylindrical valve and the knob 40. As a result, pressure in the main passage will tend to lift the knob and cylindrical valve and enhance the seal between the upper surface of disc 63 and the bottom surface 41. In this way, the seal between the openings or grooves 70 and 72 are enhanced. The positioning of the O-ring 47 between the knob and cylindrical valve has a significant advantage over placing the O-ring in a groove at the top side of the housing. Here, the control knob 40 would have difficulty sliding against the O-ring when the O-ring is under pressure. In order to avoid this problem, in the preferred embodiment, the O-ring is placed in a groove at the top side of the cylindrical valve so that the control knob, the cylindrical valve and the O-ring rotate together, even under pressure.

Referring to FIGS. 6 and 7, when the control knob 40 is rotated to the "rinse" position, the auxiliary passageway 65 is closed, since the reservoir grooves 70 and 72 are preferably sealed by valve member 63 and ports 74 and 76 no longer register with them. Thus, the flow of water passes through the main passageway 52 unaffected by the contents of the reservoir 20. Although only one of the two reservoir grooves 70 or 72 need be blocked in order to stop the dispensing of fluid from the reservoir, preferably, both grooves are blocked by one valve member 63 to avoid any leakage of fluid from the reservoir.

When the control knob is turned to the "soap" position, the high pressure in the upstream portion 54 of the cylindrical valve 52 and low pressure at the downstream portion 56 are effective to shunt a stream of water through the auxiliary passageway 65. The diverted water leaves the main passageway 22 at an upstream high pressure location and reenters the main passageway 23 at a downstream low pressure location. To this end, the diverted fluid flows in the auxiliary passage 65 through passage 58, port 64, housing groove 68, reservoir groove 72 and through port 76 to the reservoir 20 in the auxiliary passage 65 through port 74, reservoir groove 70, housing groove 67, port 66, passageway 60 and into the downstream portion 56 of the cylindrical valve 24.

The soap dispenser may be used with or without soap. If depletion of the reservoir occurs, the reservoir can be refilled with soap by turning the control knob 40 to the "off" position, disconnecting the reservoir from the housing, refilling it with soap, and reconnecting it back into the housing.

Although the above description of the invention relates to the use of a soap dispenser, the invention is also expected to be useful with other materials such as waxes, detergents or insecticides and the like.

Preferably, the housing, including its cavity, passages, grooves, control knob detentes assembly, detentes, and the cylindrical valve, including its valve member, passages, ports, splines and O-ring grooves, control knob including its spline, and container are all individually injection molded as a unit to form individual, easily assembled, plastic parts, as described. Assembly is achieved by placing O-rings 50 and 47 in their respective grooves in the housing and cylindrical valve 24, by inserting the cylindrical valve 24 with O-ring 47 through the valve cavity from the bottom side 41, until the valve member surface 63 abuts the bottom side 41, by placing the wavy spring washer 61 around the cylindrical valve 24 on the top of the housing 18, by inserting the control knob 40 on the top end of the cylindrical valve 74 and wavy spring washer 61, by threading the screws through the control knob 40 into the upper end of the cylindrical valve 24, and by connecting the container 20 with O-ring 19 into the bottom side of the housing 18.

Figure 10:
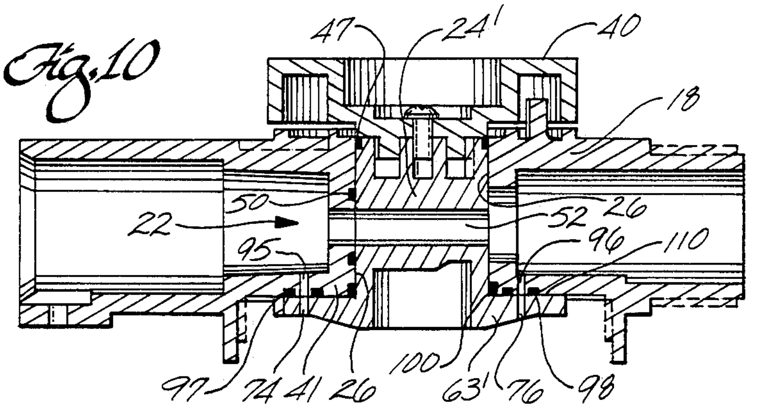
FIG. 10 is a sectional side elevation view of the soap dispenser similar to FIG. 1 showing an alternative embodiment of the auxiliary passageway.
Figure 11:
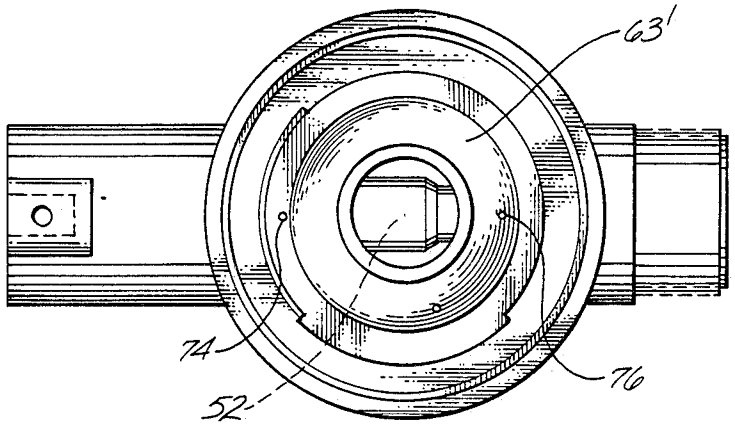
FIG. 11 is a bottom elevation view of the soap dispenser of FIG. 10, similar to FIG. 5.

FIGS. 10 and 11 depict an alternative embodiment of the invention. Identical reference numerals indicate identical elements disclosed in FIGS. 1-9. New reference numerals are used to indicate additional components. Referring to FIGS. 10 and 11 this embodiment invention also has a cylindrical valve 24' insertable from the bottom side into the valve cavity 26 for mounting and rotation in the valve cavity. The cylindrical valve has a valve member or disc 63' extends outwardly beyond the valve cavity into closely spaced opposed relation with the housing bottom side at 110. The exposed control knob 40 is again connected the cylindrical valve at the top side of the housing for manually rotating the cylindrical valve and for securing a cylindrical valve, in and relative to the housing, so that the substantially opposed relation between the housing bottom side and the valve member is maintained.

The auxiliary passageway extends from an upstream position in the main flow passage, through the reservoir, to the main flow passage at a position which is downstream from the upstream position. As discussed above, the first rotational position of the control knob causes the cylindrical to block the flow of fluid through the main passageway of the housing, a second rotation position of the control knob and cylindrical valve provides communication of the fluid through the main passage of both the housing and the cylindrical valve, and communication of fluid through the auxiliary passageway and reservoir between the upstream and downstream positions, and a third rotation position of the control knob and cylindrical valve provide fluid communication through the main passageway of both the housing and the cylindrical valve and an obstruction by the valve member of the flow fluid through the auxiliary passageway. The auxiliary passageway includes an upstream passage 95 which extends from the main passage to a position between the bottom side of the housing and the valve member, downstream passage 74 which is alignable with passage 95 and passes through the valve member 63', downstream passage 96 which passes from the main passage to a position between the housing bottom side and valve member 63' and a downstream passage 76, alignable with passage 96 through valve member 63'. We noted that the upstream passages 95 and 74 extend from the upstream side of the main passage to the reservoir whereas the downstream passages 96 and 76 extend from a position in the main passage which is downstream with respect to passages 95 and 74.

In the "soap" position (FIGS. 10 and 11), the two passages 74 and 76 in the valve member 63 register with the two passages 95 and 96, respectively, thereby forming the auxiliary passageway. Two O-rings 97 and 98, respectively, are positioned in grooves in the bottom side of the housing 41, around passages 95 and 96. A substantially watertight seal is formed between the O-rings 97 and 98 and the disc-shaped valve member 63', thereby minimizing the leakage of fluid from the main valve passageway 52 through the auxiliary passageway when the cylindrical valve 24 is in the "rinse" and "off" positions.

Additionally, the bottom side of the housing 41 may be equipped with a groove, essentially concentric about the valve cavity 26, with an O-ring 100 placed in the groove to provide additional seal between the cylindrical valve 24' and the bottom side of the housing 41.

When the control knob 40 is rotated to the "rinse" position, the auxiliary passageway is closed, since passages 95 and 96 are sealed by the valve member 63'. Thus, the flow of water passes through the main passageway 52 only, unaffected by the contents of reservoir 20.

The invention has been described in an exemplary and preferred embodiment, but it is not limited thereto. Those skilled in the art will recognize that a number of additional modifications and improvements can be made to the invention without departure from the essential spirit and scope. Therefore, the invention is not limited by the above disclosure, but only by the following claims.

What is claimed is:

1. A fluid dispenser comprising:

a housing having a top side and a bottom side, the bottom side comprising means for coupling to a container to form a fluid reservoir;

a valve cavity through the housing from the top side to the bottom side;

a cylindrical valve mounted and rotatable in the valve cavity, the cylindrical valve comprising a valve member extending outwardly beyond the valve cavity into abutting relation with the bottom side;

a main passage through the housing and cylindrical valve substantially transverse to the valve cavity;

means for coupling an upstream portion of the main passage to a high pressure fluid source;

an exposed control knob connected at the top side of the housing for manually rotating the cylindrical valve;

separate upstream and downstream housing grooves in the valve cavity, each of the grooves extending to a different position on the bottom side of the housing;

an upstream valve passage extending from an upstream portion of the main passage through the cylindrical valve to the upstream housing groove;

a downstream valve passage extending from a downstream portion of the main passage through the cylindrical valve to the downstream housing groove;

a first rotational position of the knob and cylindrical valve causing the cylindrical valve to block the flow of fluid through the main passageway of the housing;

a second rotational position of the control knob and cylindrical valve providing communication of fluid through the main passage of the housing and the cylindrical valve, and communication of fluid through the upstream valve passage and groove, through the reservoir and through the downstream groove and valve passage and back to the main passageway; and a third rotational position of the control knob and cylindrical groove providing fluid communication through the main passageway of both the housing and cylindrical valve and the valve member obstructing the opening of at least one of the grooves to the reservoir.

2. The fluid dispenser defined in claim 1, wherein the third position of the cylinder valve and valve member obstruct both of the grooves in the reservoir.

3. The fluid dispenser defined in claim 1 wherein the main passageway through the cylindrical valve comprises upstream and downstream portions with the diameter of the upstream portion substantially larger than the diameter of the downstream portion, whereby flow in the main passageway produces a positive pressure differential between the upstream and downstream passageways when the second position exists.

4. The fluid dispenser defined in claim 1 further comprising an O-ring between the housing and cylindrical valve, around the main passageway on the upstream side of the cylindrical valve.

5. The fluid dispenser defined in claim 1 comprising means for urging the cylindrical valve and valve member towards the tops side of the housing thereby enhancing the seal between the valve member and bottom side.

6. The fluid dispenser defined in claim 5 wherein the urging means comprises a spring between the top side of the housing and the bottom side of the control knob.

7. The fluid dispenser defined in claim 5 wherein the valve member comprises a top side and a bottom side with the top side having a substantially flat and smooth surface and the bottom side of the housing having a substantially flat and smooth surface and the top side of the valve member urged and abutting against the bottom side of the housing to thereby enable the top side of the valve member to slide along the bottom side of the housing and maintain a tight seal therebetween.

8. The fluid dispenser defined in claim 5 further comprising reservoir grooves in the bottom side of the housing, a separate groove being in communication with each of the housing grooves.

9. The fluid dispenser defined in claim 5 wherein the urging means comprises an O-ring mounted on and around the cylindrical valve within the valve cavity to form a seal between the cylindrical valve and housing toward the top side from the main passage, fluid pressure in the main passage forcing the O-ring, cylindrical valve and valve member toward the top side relative to the housing to thereby enhance the seal between the valve member and bottom side.

10. A unitary cylindrical valve for a dispenser for controlling the passage of a fluid through upstream and downstream passages in the dispenser comprising:

a cylindrical valve body having a top side and a bottom side;

a valve member at the bottom side of the cylindrical valve body extending outwardly beyond the cylindrical valve body;

at least two spaced apart openings through the valve member for admitting fluid flow between such upstream and downstream passages;

a main passageway diametrically through the central portion of the cylindrical valve having upstream and downstream portions and the diameter of the upstream portion being substantially larger than the diameter of the downstream portion, whereby fluid flow in the main passageway produces a positive pressure differential between the upstream portion and the downstream portion;

a first passageway from the upstream portion of the main passageway extending substantially transversely through the cylindrical valve to such upstream passage; and a second passageway from the downstream portion of the main passageway extending substantially transversely through the cylindrical valve to such downstream passage.

11. The cylindrical valve defined in claim 10 comprising a ring-shaped groove coaxial with and at the top side of the valve body for receiving an O-ring.

12. A fluid dispenser for a source of high pressure fluid and a further fluid comprising:

a housing having a top side and a bottom side;

a valve cavity through the housing from the top side to the bottom side;

a rotatable cylindrical valve rotatable in the valve cavity and comprising an integral valve member extending outward into opposed rotation with the housing bottom side around the valve housing;

a main passage through the housing and the cylindrical valve having upstream and downstream portions;

connector means for connecting the upstream portion of the main passage to such a source of high pressure fluid;

means for connecting the bottom side of the housing to a fluid container to form a reservoir for such further fluid;

an exposed control knob at the top side of the housing connected for rotation of the cylindrical valve;

an auxiliary passage extending from the upstream cylindrical portion of the main passage, through the cylindrical valve, between the cylindrical valve and housing to the reservoir, then from the reservoir between the cylindrical valve and the housing and through the cylindrical valve back to a downstream side of the main passage; and a first rotational position of the cylindrical valve blocking the flow of high pressure fluid through the main passage, a second rotational position of the cylindrical valve passing the high pressure fluid through the main passage in the housing and cylindrical valve while passing a secondary flow of such high pressure fluid through the auxiliary passage to thereby dispense the further fluid into the fluid flowing through the main passage and a third rotational position of the cylindrical valve for passing the high pressure fluid through the main passage in the housing and cylindrical valve while blocking any flow of fluid through the auxiliary passage.

13. The fluid dispenser of claim 12 comprising seal means between the housing and cylindrical valve at the upstream portion, for sealing therebetween when in the first position.

14. The fluid dispenser of claim 12 wherein the auxiliary passage comprises a groove between the housing and cylindrical valve.

15. The fluid dispenser of claim 14 wherein the groove comprises first and second spaced apart grooves extending to the reservoir.

16. The fluid dispenser of claim 14 comprising a valve member connected to and rotated with the cylindrical valve for simultaneously opening both grooves to the reservoir when the second position exists and for closing at least one of the grooves to the reservoir when the third position exists.

17. The fluid dispenser of claim 16 wherein the bottom side of the housing comprises at least one surface through which each of the grooves open to the reservoir and over which the valve member slides and closes at least one of the grooves to the reservoir when the third position exists.

18. The fluid dispenser of claim 16 wherein the valve member comprises first and second openings through the valve member for opening, respectively, the first and second grooves to the reservoir when the second position exists.

19. The fluid dispenser of claim 15 wherein the cylindrical valve comprises a first passage positioned for communication between the first groove and the main passage in the cylindrical valve and a second passage positioned for communication between the second groove and the main passage in the cylindrical valve when the second position exists.

20. The fluid dispenser of claim 19 wherein the main passage between the first and second passage comprise a restriction causing greater pressure at the upstream portion of the main passage adjacent the first passage.

21. The fluid dispenser of claim 17 comprising means for urging the valve member toward the bottom side of the housing.

22. The fluid dispenser of claim 21 wherein the means for urging comprises a spring.

23. The fluid dispenser of claim 21 wherein the means for urging comprising an O-ring around the cylindrical valve.

24. The fluid dispenser of claim 21 wherein the cylindrical valve and valve member are a unitary part.

25. The fluid dispenser of claim 24 wherein the valve member, cylindrical valve and housing are all plastic.

26. A fluid dispenser comprising:

a housing having a top side and a bottom side, the bottom side comprising means for coupling to a container to form a fluid reservoir;

a valve cavity through the housing from the top side to the bottom side;

a cylindrical valve insertable from the bottom side into the valve cavity and mounted and rotatable in the valve cavity, the cylindrical valve comprising a valve member extending outwardly beyond the valve cavity into closely spaced opposed relation with the housing bottom side, the cylindrical valve and valve member being integrally formed as a unit;

a main passage through the housing and cylindrical valve substantially transverse to the valve cavity;

means for coupling an upstream portion of the main passage to a high pressure fluid source;

an exposed control knob connected to the cylindrical valve at the top side of the housing for manually rotating the cylindrical valve and for securing the cylindrical valve, relative to the housing, so that the substantially opposed relation between the housing bottom side and the valve member is maintained;

a groove around the cylindrical valve in the valve cavity having an O-ring in the groove forming a fluid seal between the housing and cylindrical valve toward the housing top side from the main passage;

an auxiliary passageway extending from an upstream position in the main flow passage, through the reservoir, to the main flow passage at a position which is downstream from the upstream position, the auxiliary passageway comprising:

upstream passage and downstream passage extending from the main flow passage to the valve member at locations between the valve member and the housing bottom side, further upstream passage and further downstream passage in the valve member alignable with, respectively, the upstream passage and the downstream passage;

a first rotational position of the control knob and cylindrical valve causing the cylindrical valve to block the flow of fluid through the main passageway of the housing;

a second rotational position of the control knob and cylindrical valve providing communication of fluid through the main passage of both the housing and the cylindrical valve, and communication of fluid through the auxiliary passageway and the reservoir between the upstream and the downstream positions; and a third rotational position of the control knob and cylindrical valve providing fluid communication through the main passageway of both the housing and the cylindrical valve, and an obstruction by the valve member of the flow of fluid through the auxiliary passageway.

27. The fluid dispenser defined in claim 26 further comprising an O-ring between the housing and cylindrical valve, around the main passageway on the upstream side of the cylindrical valve.

28. The fluid dispenser of claim 26 wherein the valve member comprises a disk shape.

29. The fluid dispenser of claim 26 further comprising a further groove provided in the bottom side of the housing around valve cavity having an O-ring in the further groove forming a fluid seal between the bottom side of the housing and the valve member.

* * * * *